(12) United States Patent
Mirza-Baig

(10) Patent No.: US 7,457,417 B1
(45) Date of Patent: Nov. 25, 2008

(54) APPROACH FOR CONFIGURING WIRELESS DEVICES

(75) Inventor: Attaullah Mirza-Baig, Cupertino, CA (US)

(73) Assignee: Ricoh Company, Ltd. (JP)

( * ) Notice: Subject to any disclaimer, the term of this patent is extended or adjusted under 35 U.S.C. 154(b) by 664 days.

(21) Appl. No.: 11/048,074

(22) Filed: Jan. 31, 2005

(51) Int. Cl.
*H04K 1/00* (2006.01)
*H04L 9/00* (2006.01)

(52) U.S. Cl. .......................................... 380/270; 380/44
(58) Field of Classification Search ................. 380/270, 380/44; 716/168; 726/2–3
See application file for complete search history.

(56) References Cited

U.S. PATENT DOCUMENTS 6,292,833 B1 * 9/2001 Liao et al. .................... 709/229
7,047,405 B2 * 5/2006 Mauro ......................... 713/166
7,299,490 B2 * 11/2007 Berkema et al. ............... 726/2

\* cited by examiner

*Primary Examiner*—Hosuk Song
(74) *Attorney, Agent, or Firm*—Hickman Palermo Truong & Becker LLP

(57) ABSTRACT

According to an approach for configuring wireless devices, a wireless device determines whether it is currently configured to use secure wireless communications when communicating with other wireless devices. If not, then the wireless device configures one or more wireless security parameters so that the wireless device will use a secure wireless communications protocol to communicate with other wireless devices. The wireless device may also generate one or more encryption keys for use with the secure wireless communications protocol. The wireless device provides the one or more wireless security parameters and the one or more encryption keys to a user. The wireless device may print a page specifying the one or more wireless security parameters and the one or more encryption keys or generate and send to the user an electronic message, email or facsimile containing the one or more wireless security parameters and the one or more encryption keys.

18 Claims, 3 Drawing Sheets

APPROACH FOR CONFIGURING WIRELESS DEVICES

FIELD OF THE INVENTION

This invention relates generally to configuring wireless devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Many devices that have been conventionally connected to wired networks are more and more configured with wireless communications interfaces to allow the devices to be used in wireless communications environments. For example, many printers may be configured with both a wired network interface, such as an Ethernet card, and a wireless communications interface, such as an 802.11 wireless interface card. In this situation, users on a wired network may print to the printer. Users who are not connected to the wired network can also print to the printer using wireless communications. It may be more convenient for laptop computer users to print to the printer using a wireless communications link instead of connecting their laptop computers to the wired network.

One drawback with devices having wireless communications interfaces is that they are susceptible to attack when they are first installed but not yet configured with appropriate security. For example, wireless-capable devices are often initially configured with no security or with a default set of security parameters that are easily obtained from manufacturers or other sources. This creates vulnerabilities that can be exploited by third parties. For example, third parties may use the well-known security parameters to access a newly installed wireless device and make unauthorized changes to the configuration. Sophisticated third parties may also change security parameters and permissions to "hijack" the device. Because of these concerns, many wireless devices are configured with a wired network interface to allow the devices to be configured over a wired network. Wireless communications are disabled until the devices are properly configured by administrative personnel. This represents an added expense for equipment that may only be used once during initial configuration. Based on the foregoing, there is a need for an approach for configuring wireless devices that does not suffer from limitations of prior approaches.

SUMMARY

According to an approach for configuring wireless devices, a wireless device determines whether it is currently configured to use secure wireless communications when communicating with other wireless devices. If not, then the wireless device configures one or more wireless security parameters so that the wireless device will use a secure wireless communications protocol to communicate with other wireless devices. The wireless device may also generate one or more encryption keys for use with the secure wireless communications protocol. The wireless device provides the one or more wireless security parameters and the one or more encryption keys to a user. The wireless device may print a page specifying the one or more wireless security parameters and the one or more encryption keys. Alternatively, the wireless device may generate and send to the user an electronic message, email or facsimile containing the one or more wireless security parameters and the one or more encryption keys. The user then uses the wireless security parameters to configure the wireless device, which may include again changing the security parameters.

According to one aspect of the invention, a wireless device comprises a wireless communications interface, one or more processors and a memory. The memory stores instructions which, when executed by the one or more processors, cause determining whether the wireless device is currently configured to use secure wireless communications when communicating with other wireless devices. If the wireless device is not currently configured to use secure wireless communications when communicating with other wireless devices, then one or more configuration parameters are updated to cause the wireless device to use a secure wireless communications protocol. Also, one or more encryption keys are generated for use with the secure wireless communications protocol. The updated one or more configuration parameters and the one or more encryption keys are provided to a user.

According to another aspect of the invention, a printing device comprises a wireless communications interface; one or more processors and a memory. The memory stores instructions which, when executed by the one or more processors, cause determining whether the printing device is currently configured to use secure wireless communications when communicating with other wireless devices. If the printing device is not currently configured to use secure wireless communications when communicating with other wireless devices, then one or more configuration parameters are updated to cause the printing device to use a secure wireless communications protocol. Also, the updated one or more configuration parameters are provided to a user.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. Overview
II. Architecture
III. Configuring Wireless Devices
IV. Selective Configuration
V. Implementation Mechanisms

I. Overview

According to an approach for configuring wireless devices, a wireless device determines whether it is currently configured to use secure wireless communications when communicating with other wireless devices. If not, then the wireless device configures one or more wireless security parameters so that the wireless device will use a secure wireless communications protocol to communicate with other wireless devices. The wireless device may also generate one or more encryption keys for use with the secure wireless communications protocol. The wireless device provides the one or more wireless security parameters and the one or more encryption keys to a user. The wireless device may print a page specifying the one or more wireless security parameters and the one or more encryption keys. Alternatively, the wireless device may generate and send to the user an electronic message, email or facsimile containing the one or more wireless security parameters and the one or more encryption keys. The user then uses the wireless security parameters to configure the wireless device, which may include again changing the security parameters.

The approach ensures that the wireless device always uses at least some minimum level of security to thwart attempts by third parties to gain unauthorized access to the wireless device, at least until authorized personnel can reconfigure the wireless device. The approach is particularly useful for protecting new wireless devices when they are first put into service, but not yet configured. Furthermore, the approach eliminates the need for a wired interface for configuring wireless devices.

II. Architecture

Figure 1:
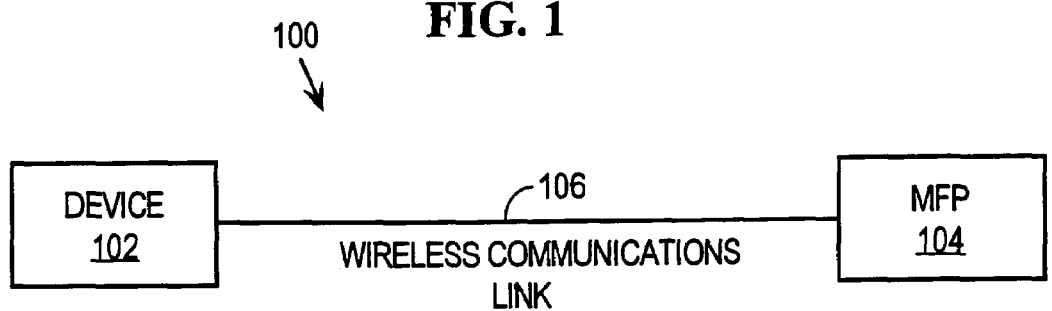
FIG. 1 is a block diagram that depicts an arrangement for configuring a wireless multi-function peripheral device according to an embodiment of the invention.

FIG. 1 is a block diagram that depicts an arrangement 100 for configuring wireless devices according to an embodiment of the invention. In arrangement 100, a device 102 is communicatively coupled to a multi-function peripheral (MFP) 104 via a wireless communications link 106. Device 102 may be any type of device capable of participating in wireless communications with MFP 104 over wireless communications link 106. Examples of device 102 include, without limitation, a workstation, a personal computer, a laptop computer, a personal digital assistant (PDA), a cellular telephone and any type of mobile device. Device 102 may also have wired connections and various other functionalities that are not depicted in the figures or described herein for purposes of explanation.

MFP 104 may be any type of multi-functional peripheral and may have any combination of functionalities, depending upon the requirements of a particular application. Examples of MFP 104 include, without limitation, a printing device, a copy machine, a facsimile machine, a scanner and other devices that have any combination of printing, copying, facsimile, scanning, etc. Wireless communications link 106 may be implemented with any type of medium and/or mechanism that facilitates the wireless exchange of information between device 102 and MFP 104. Furthermore, wireless communications link 106 may use any type of communications protocol and may be secured or unsecured, depending upon the requirements of a particular application.

Figure 2:
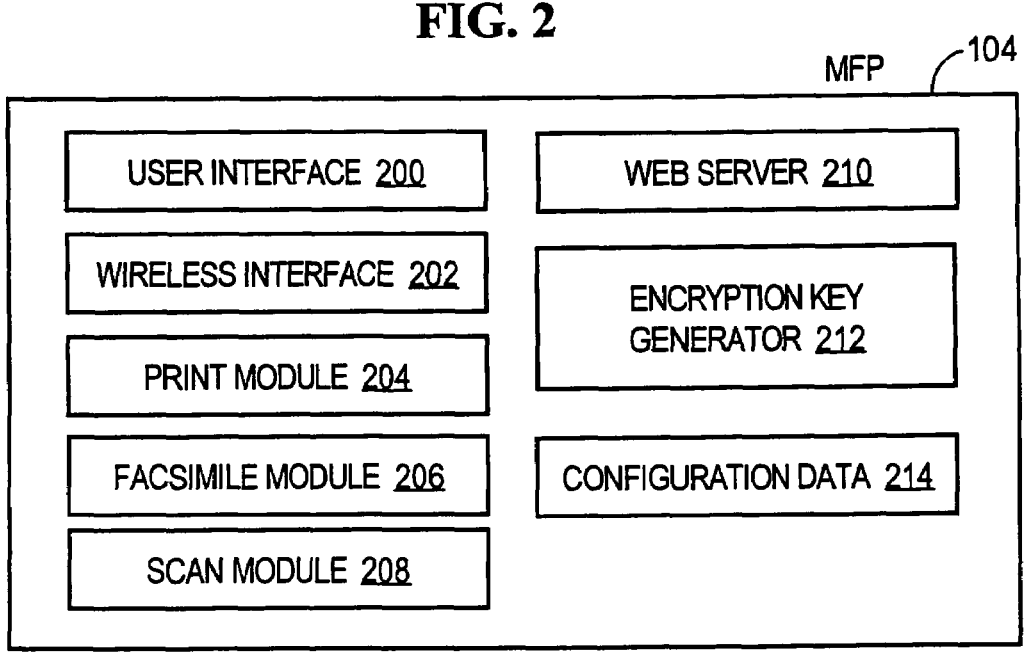
FIG. 2 is a block diagram that depicts an example implementation of a multi-function peripheral.

FIG. 2 is a block diagram that depicts an example implementation of MFP 104. In this example, MFP 104 includes a user interface 200, a wireless interface 202, a print module 204, a facsimile module 206, a scan module 208, a web server 210, an encryption key generator 212 and configuration data 214. MFP 104 may include other components and functionalities or fewer components and functionalities than those depicted in FIG. 2 and described herein, depending upon the requirements of a particular application.

User interface 200 may be any mechanism and/or medium that provides for the exchange of information between a user and MFP 104. Examples of user interface 200 include, without limitation, a cathode ray tube (CRT), a liquid crystal display (LCD), a keyboard, touchpad, mouse, trackball, a microphone and speakers, and any combination thereof. Wireless interface 202 may be implemented using any mechanism that allows MFP 104 to communicate on wireless communications link 106. Examples of wireless interface 202 include, without limitation, a wireless interface card.

Print module 204, facsimile module 206 and scan module 208 may be implemented using any combination of hardware and software that performs print, facsimile and scan functions, respectively. Examples of web server 210 include, without implementation, an Apache web server. Encryption key generator 212 is a mechanism and/or process configured to generate encryption keys for use in secure communications, as described in more detail hereinafter. Configuration data 214 may include any type of configuration data used by MFP 104. For example, configuration data 214 may include operational parameters, wireless security parameters and encryption keys. Configuration data 214 may be maintained in non-volatile storage, for example, on tape, one or more disks, or a flash memory.

III. Configuring Wireless Devices

Figure 3:
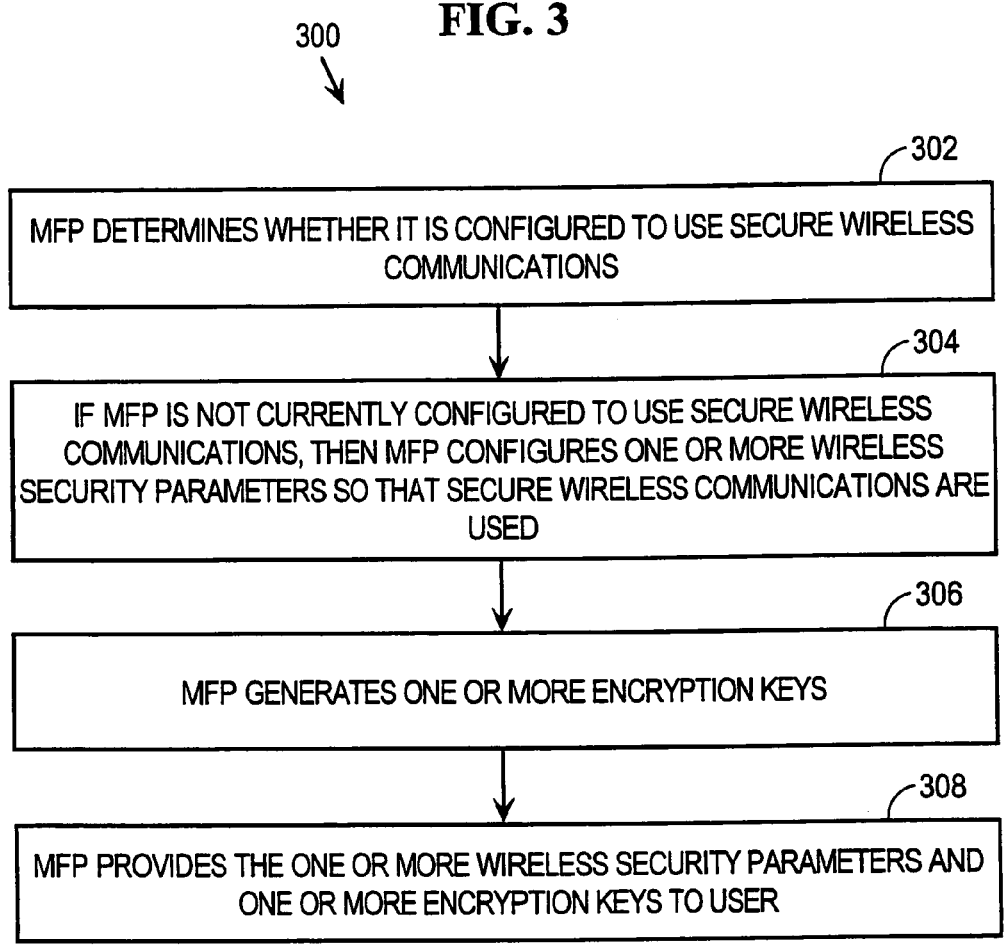
FIG. 3 is a block diagram that depicts an approach for configuring a wireless device according to one embodiment of the invention.

FIG. 3 is a block diagram that depicts an approach for configuring a wireless device according to one embodiment of the invention. In this example, MFP 104 is configured with a default set of parameters. The default parameters may specify, for example, a default IP address, a default wireless service area, that MFP is to operate in adhoc (peer-to-peer) wireless mode.

In step 302, MFP 104 determines whether it is currently configured to use secure wireless communications when communicating with other wireless devices. According to one embodiment of the invention, MFP 104 makes this determination by inspecting one or more wireless security parameters stored in configuration data 214. For example, MFP 104 may inspect wireless security parameters stored in configuration data 214 to determine whether MFP 104 is configured to use encryption for wireless communications.

If in step 302, MFP 104 determines that it is not currently configured to use secure wireless communications when communicating with other wireless devices, then in step 304, MFP 104 configures itself to use secure wireless communications when communicating with other wireless devices. This may include, for example, setting various wireless security parameters in configuration data 214 to specify that MFP 104 is to use a particular communications protocol and/or encryption. According to one embodiment of the invention, MFP 104 changes one or more wireless security parameters in configuration data 214 to cause MFP 104 to use a secure communications protocol, such as the wired equivalent privacy (WEP) protocol or the Wi-Fi protected access (WPA) protocol. MFP 104 may also change any other configuration data 214 as necessary. For example, MFP 104 may change its IP address, wireless service area and wireless operating mode.

In step 306, MFP 104 causes encryption key generator 212 to generate one or more encryption keys to be used with the secure communications protocol. Configuration data 214 may specify any attributes of the encryption keys to be generated. For example, configuration data 214 may specify the type, number or length of encryption keys to be generated.

Configuration data 214 may also specify an algorithm to be used to generate the encryption keys. For example, configuration data 214 may specify that a portion or all of the MAC address of MFP 104, e.g., the last 10 hex digits of a 12 hex digit MAC address, is to be used to generate a WEP encryption key. Any type of encryption algorithm may be used to generate the encryption keys, depending upon the requirements of a particular implementation. Some implementations may use "stronger" encryption keys than others. A one-way function, such as a hash, may be used to reduce the likelihood of an encryption key being "broken" by an unauthorized third party. The encryption keys may be stored in configuration data 214.

In step 308, MFP 104 provides the wireless security parameters and encryption keys to a user. The wireless security parameters and encryption keys allow the recipient of the wireless security parameters and the encryption keys, such as administrative personnel, to establish a secure wireless communications link with MFP 104 and manage MFP 104, while at the same time preventing unauthorized access to MFP 104 by a third party. Administrative personnel may decide to change the type of encryption used, for example, to use a more robust encryption protocol. For example, the encryption protocol may be changed from WEP to WPA, which is generally considered to be stronger.

MFP 104 may provide the wireless security parameters and encryption keys to the user in a variety of ways. For example, MFP 104 may print a page specifying the wireless security parameters and the one or more encryption keys. The page may be printed at MFP 104, e.g., via print module 204, or at another location near the user. The print location may be specified in configuration data 214. There may be some situations where MFP 104 may be located in a public location or it is otherwise desirable to control how and when the page specifying the wireless security parameters and the one or more encryption keys is printed. For example, it may be desirable to not print the page until it is known that an authorized user is at the MFP 104 and will personally receive the printed page. According to one embodiment of the invention, the page containing the wireless security parameters and encryption keys is not printed at MFP 104 until a user is authenticated. The user may be authenticated in a variety of ways. For example, MFP 104 may query a user to enter an access code on a keypad. The access code entered by the user is compared to data stored in configuration data 214. If the access code matches the data stored in configuration data 214, then the page containing the wireless security parameters and encryption keys is printed at MFP 104. If the access code does not match the data stored in configuration data 214, then the page is not printed. This approach allows the wireless device to determine that secure wireless communications should be enabled, but to defer providing the necessary security parameters and encryption keys until it is known that an authorized user is at the MFP 104 to receive them.

As an alternative to printing the wireless security parameters and the one or more encryption keys, MFP 104 may generate an electronic message, email or facsimile containing the one or more wireless security parameters and then send the electronic message, email or facsimile to the user. The type of notification to be used, along with details about the notification, may be stored in configuration data 214. For example, configuration data 214 may specify that notification is to be performed via an email and specify an email address to which the email is to be sent. As another example, configuration data 214 may specify that notification is to be performed via facsimile and specify a telephone number to which the facsimile is to be sent. Configuration data 214 may also specify a schedule or particular time when notification is to be made. For example, configuration data 214 may specify that notification is to be made by printing a page and that the page is to be printed at a particular location, i.e., printing device, at a particular date and time. These parameters may be established to coincide with the location of a user so that an unauthorized third party does not inadvertently obtain the printed page with the wireless security parameters and encryption keys.

IV. Selective Configuration

The approach may be selectively implemented the first time that a network device is activated or at any other time, depending upon the requirements of a particular implementation. According to one embodiment of the invention, configuration data 214 contains data, for example a bit, that indicates whether the approach described herein for configuring wireless devices should be performed. If the bit is set, then the approach is performed. If the bit is not set, then the approach is not performed. For new wireless devices, a manufacturer may choose to set the bit to ensure that the approach will be performed when the new wireless devices are first initialized. Once a wireless device is properly configured, administrative personnel may choose to leave the bit set so that the wireless device will always check whether secure wireless communications are enabled. In this situation, the check may be performed according to a schedule, or on an ad-hoc basis.

In other applications, administrative personnel may choose to reset the bit set so that the wireless device will not perform any further checks to determine whether secure wireless communications are enabled. This may be used, for example, in applications where a wireless device is used in an environment that is presumed or known to be secure, or where the additional protection provided by the approach described herein is otherwise deemed to not be necessary.

V. Implementation Mechanisms

Figure 4:
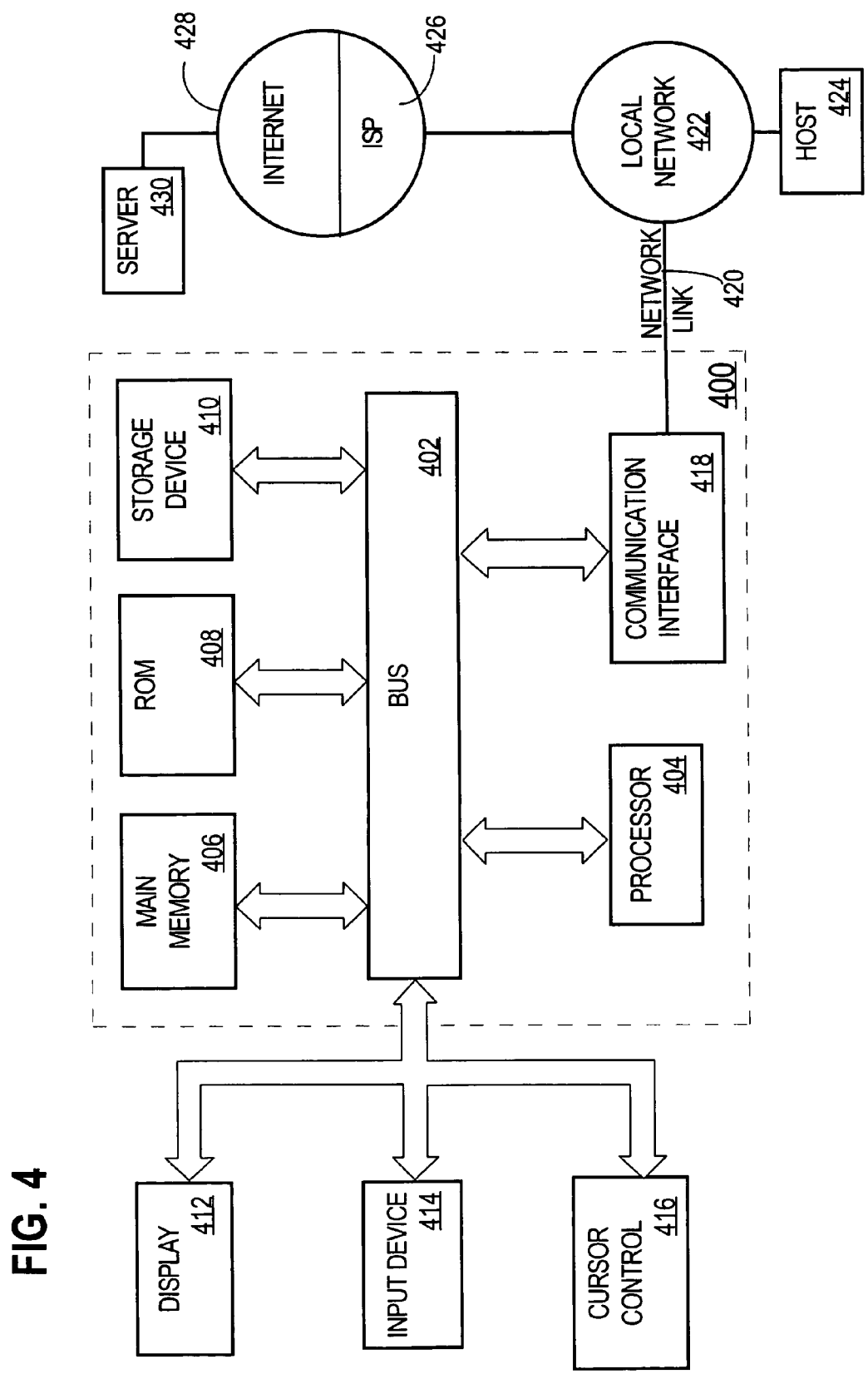
FIG. 4 is a block diagram of a computer system on which embodiments of the invention may be implemented.

Although the approach described herein for configuring wireless devices has been primarily described in the context of MFPs, the approach is applicable to any type of device. The approach may be implemented on any type of computing architecture and the invention is not limited to any particular platform or context. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A wireless device comprising:
a wireless communications interface;
one or more processors; and
a memory storing instructions which, when executed by the one or more processors, cause
determining whether the wireless device is currently configured to use secure wireless communications when communicating with other wireless devices; and
if the wireless device is not currently configured to use secure wireless communications when communicating with other wireless devices, then
updating one or more configuration parameters to cause the wireless device to use a secure wireless communications protocol,
generating one or more encryption keys for use with the secure wireless communications protocol, and
providing the updated one or more configuration parameters and the one or more encryption keys to a user.

2. The wireless device as recited in claim 1, wherein determining whether the wireless device is currently configured to use secure wireless communications when communicating with other wireless devices includes determining whether the wireless device is currently configured to use the wired equivalent privacy (WEP) protocol or the wi-fi protected access (WPA) protocol.

3. The wireless device as recited in claim 1, wherein the wireless device is further configured to use the wired equivalent privacy (WEP) protocol when communicating with other wireless devices.

4. The wireless device as recited in claim 1, wherein the wireless device is further configured to provide the updated one or more configuration parameters and the one or more encryption keys to the user by printing a page that contains the updated one or more configuration parameters and the one or more encryption keys.

5. The wireless device as recited in claim 1, wherein the wireless device is further configured to provide the updated one or more configuration parameters and the one or more encryption keys to the user in response to receiving and successfully verifying input data from the user.

6. The wireless device as recited in claim 1, wherein the wireless device is further configured to provide the updated one or more configuration parameters and the one or more encryption keys to the user by generating and sending to the user an email containing the updated one or more configuration parameters and the one or more encryption keys.

7. The wireless device as recited in claim 1, wherein the wireless device is further configured to provide the updated one or more configuration parameters and the one or more encryption keys to the user by generating and sending to the user an electronic message containing the updated one or more configuration parameters and the one or more encryption keys.

8. The wireless device as recited in claim 1, wherein the wireless device is further configured to provide the updated one or more configuration parameters and the one or more encryption keys to the user by generating and sending to the user a facsimile containing the updated one or more configuration parameters and the one or more encryption keys.

9. A printing device comprising:
a wireless communications interface;
one or more processors; and
a memory storing instructions which, when executed by the one or more processors, cause
determining whether the printing device is currently configured to use secure wireless communications when communicating with other wireless devices; and
if the printing device is not currently configured to use secure wireless communications when communicating with other wireless devices, then
updating one or more configuration parameters to cause the printing device to use a secure wireless communications protocol, and
providing the updated one or more configuration parameters to a user.

10. A method comprising:
at a wireless device, determining whether the wireless device is currently configured to use secure wireless communications when communicating with other wireless devices; and
at the wireless device, if the wireless device is not currently configured to use secure wireless communications when communicating with other wireless devices, then
updating one or more configuration parameters to cause the wireless device to use a secure wireless communications protocol,
generating one or more encryption keys for use with the secure wireless communications protocol, and
providing the updated one or more configuration parameters and the one or more encryption keys to a user.

11. The method as recited in claim 10, wherein determining whether the wireless device is currently configured to use secure wireless communications when communicating with other wireless devices includes determining whether the wireless device is currently configured to use the wired equivalent privacy (WEP) protocol or the wi-fi protected access (WPA) protocol.

12. The method as recited in claim 10, wherein the wireless device is further configured to use the wired equivalency privacy (WEP) protocol when communicating with other wireless devices.

13. The method as recited in claim 10, wherein the wireless device is further configured to provide the updated one or more configuration parameters and the one or more encryption keys to the user by printing a page that contains the updated one or more configuration parameters and the one or more encryption keys.

14. The method as recited in claim 10, wherein the wireless device is further configured to provide the updated one or more configuration parameters and the one or more encryption keys to the user in response to receiving and successfully verifying input data from the user.

15. The method as recited in claim 10, wherein the wireless device is further configured to provide the updated one or more configuration parameters and the one or more encryption keys to the user by generating and sending to the user an email containing the updated one or more configuration parameters and the one or more encryption keys.

16. The method as recited in claim 10, wherein the wireless device is further configured to provide the updated one or more configuration parameters and the one or more encryption keys to the user by generating and sending to the user an electronic message containing the updated one or more configuration parameters and the one or more encryption keys.

17. The method as recited in claim 10, wherein the wireless device is further configured to provide the updated one or more configuration parameters and the one or more encryption keys to the user by generating and sending to the user a facsimile containing the updated one or more configuration parameters and the one or more encryption keys.

18. A method comprising:
at a printing device, determining whether the printing device is currently configured to use secure wireless communications when communicating with other wireless devices; and
at the printing device, if the printing device is not currently configured to use secure wireless communications when communicating with other wireless devices, then
updating one or more configuration parameters to cause the printing device to use a secure wireless communications protocol, and
providing the updated one or more configuration parameters to a user.

* * * * *